United States Patent [19]

Linford

[11] 4,228,716
[45] Oct. 21, 1980

[54] DEVICE AND METHOD FOR OPTICAL TONE GENERATION

[75] Inventor: James Linford, Livingston Manor, N.Y.

[73] Assignee: I-Production Establishment, Vaduz, Liechtenstein

[21] Appl. No.: 961,267

[22] Filed: Nov. 16, 1978

Related U.S. Application Data

[63] Continuation of Ser. No. 820,348, Jul. 29, 1977, abandoned.

[51] Int. Cl.³ ............................................. G10H 3/06
[52] U.S. Cl. ................................. 84/1.18; 84/464 R; 84/1.28; 179/100.3 K
[58] Field of Search ...................... 84/1.01, 1.18, 1.28, 84/464; 179/100.3 K, 100.41 L; 250/226

[56] References Cited

U.S. PATENT DOCUMENTS

| | | | |
|---|---|---|---|
| 1,777,037 | 9/1930 | DeForest | 179/100.3 K |
| 2,410,104 | 10/1946 | Rainey | 179/100.41 L |
| 2,587,219 | 2/1952 | Rettinger | 179/100.3 K |
| 3,407,272 | 10/1968 | Barocela | 179/100.3 K |
| 3,420,940 | 1/1969 | Glass et al. | 84/1.03 |
| 3,513,268 | 5/1970 | John, Jr. | 179/100.3 K |
| 3,733,953 | 5/1973 | Ferber | 84/1.18 X |
| 3,800,058 | 3/1974 | Bartoic et al. | 84/1.18 |
| 3,842,702 | 10/1974 | Tsunoo | 84/1.01 |
| 3,929,398 | 12/1975 | Bates | 250/226 |
| 3,938,088 | 2/1976 | Clark | 250/226 |
| 3,943,814 | 3/1976 | Wemekamp | 84/1.01 |
| 3,969,593 | 7/1976 | Vlahos | 179/100.3 K |
| 4,023,040 | 5/1977 | Weber | 250/226 |
| 4,028,977 | 6/1977 | Ryeczek | 84/1.18 |

OTHER PUBLICATIONS

Davidge et al., Multichromatic Optical Film Recording of Multiple Signals, IBM Technical Disclosure Bulletin, Nov. 1969.
Barber, 21 Ways to Pick Data off Moving Objects, Control Engineering, Oct. 1963.

Primary Examiner—J. V. Truhe
Assistant Examiner—Forester W. Isen
Attorney, Agent, or Firm—Pennie & Edmonds

[57] ABSTRACT

An optical tone generator comprises sensing means responsive to light of different respective colors for selectively producing respective output signals corresponding to such respective colors, and a tone generator responsive to the sensing means for emitting a tone corresponding to the signal produced by the sensing means. In a preferred embodiment, fiber optic light conduits are disposed within an elongated baton for manual translation along a line of discretely changing colored strips to produce tones corresponding to the various colors. This device is particularly advantageous for teaching musical composition because it permits a child to vary pitch, duration and tempo by readily perceived variations in color, length and speed, respectively.

10 Claims, 3 Drawing Figures

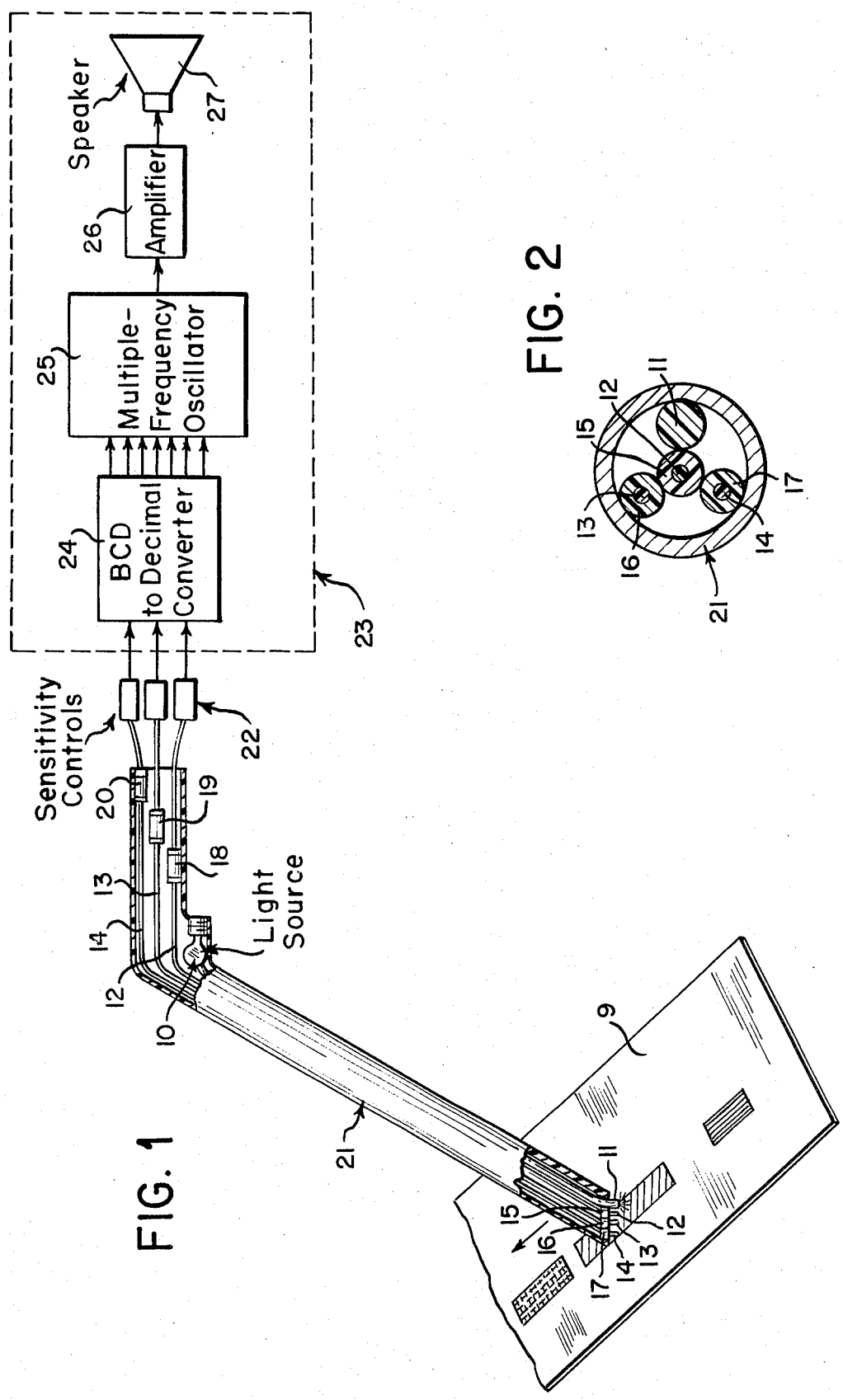

DEVICE AND METHOD FOR OPTICAL TONE GENERATION

This is a continuation of application Ser. No. 820,348, filed July 29, 1977, now abandoned.

BACKGROUND OF THE INVENTION

This invention relates to a device and method for optical tone generation. More specifically, it relates to a device and method for picking up light reflected from a colored control surface and emitting a tone coded in pitch to the color of the surface.

The device is particularly useful as an educational toy for children. In conjunction with the invention, children can compose their own musical compositions using crayons or colored pencils and play their compositions using the tone generator of the invention.

While a child can readily exercise his creative abilities in the visual arts, there is no simple means whereby a yound child can exercise and develop his creative abilities in the area of musical composition. There are a host of media through which he can draw, paint, model and sculpt. But if he seeks to reproducibly compose an aural composition, the child is immediately confronted with a traditional system of musical notation which is complex even for many adults. Indeed teaching devices have been designed to teach the child merely the names of the components of this notation system. See U.S. Pat. No. 2,447,213 issued to E. F. Sledge.

While devices exist for reading printed sheet music, these devices are too sophisticated and too automatic to serve as useful teaching aids for small children. U.S. Pat. No. 3,424,851 issued to D. M. Weitzner, for example, discloses a music reading and sounding device for which a composer will transcribe into a series of opaque elements on translucent paper a musical composition written in conventional musical notation. The thus-encoded translucent paper is then fed into the automatic playing device wherein the opaque elements are detected by their interruption of light paths through the translucent paper and appropriate prerecorded tones are selectively accessed and replayed. Tempo is varied by a rotatable knob.

While the Weitzner device may have merit for the adult composer, for the child it still interposes a level of abstraction between him and reproducible composition. At the very least, the user of the Weitzner device must understand the abstract code whereby conventionally denoted tones are encoded onto the translucent sheet.

Accordingly, a simpler device using parameters more readily perceived by the child is required in an effective teaching device.

SUMMARY OF THE INVENTION

In accordance with the invention, an optical tone generator comprises sensing means responsive to light of different respective colors for selectively producing respective output signals corresponding to such respective colors, and a tone generator responsive to the sensing means for emitting a tone corresponding to the signal produced by the sensing means. In this manner, a sequence of colors selected from a predetermined set of colors may be scanned and each of the colors will cause the tone generator to produce an audible tone corresponding to that color. The colors may be pre-printed on a sheet of paper or other surface (herein called a control surface), or they may be provided in the form of crayons or paints for use in composing music to be played by the tone generator.

The tone generator preferably includes one or more light pipes, or fiber optics for sensing the color of the control surface to produce the corresponding pitch tone and, if desired, to transmit light to the control surface.

In a preferred embodiment, the tone generator includes a light source for illuminating a colored control surface and a plurality of light conduits for transmitting light of selected colors to respective photosensors. The photosensor outputs, in turn, are coupled to tone generation means by switching circuitry so that the tone emitted is coded in pitch to the color of the control surface. The light conduits are preferably fiber optics disposed within an elongated baton for manual translation along a line of discretely changing colored strips. This device is particularly advantageous for teaching musical composition because it permits a child to vary pitch, duration and tempo by readily perceived variations in color, length and speed, respectively.

BRIEF DESCRIPTION OF THE DRAWINGS

The nature, advantages and various features of the invention will appear more fully upon consideration of the illustrative embodiments now to be described in detail in connection with the accompanying drawings.

In the drawings:

FIG. 1 is a partially schematic block diagram illustrating an exemplary optical tone generation device in accordance with the invention;

FIG. 2 is an end view of the input end of the device shown in FIG. 1; and

For convenience of reference, the same structural elements are designated by the same reference numerals throughout the drawings.

DETAILED DESCRIPTION OF PREFERRED EMBODIMENTS

Figure 3:
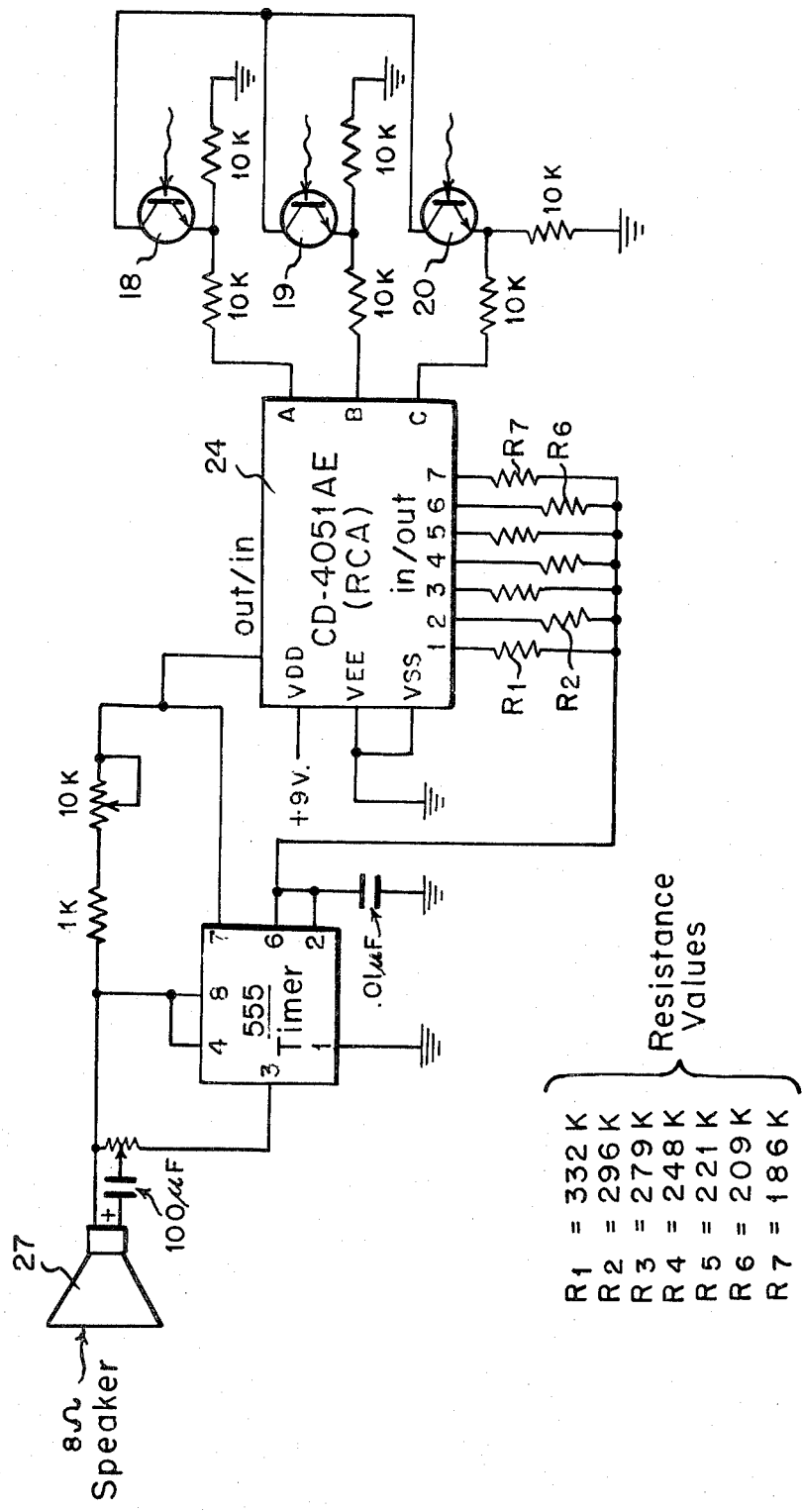
FIG. 3 is a circuit diagram of a preferred multiple-frequency audio frequency oscillator useful in the embodiment of FIG. 1.

Referring to the drawings, FIG. 1 is a block diagram schematically illustrating an optical tone generating device for generating a tone coded in pitch to the color of a colored control surface 9. The device comprises a light source such as a three volt incandescent lamp 10 for directing light onto control surface 9, through for example, one or more light source fiber optics 11. A plurality of color-selective light pick-up elements, such as filtered fiber optics 12, 13 and 14 having red, green and blue filters 15, 16 and 17, respectively, are provided for picking up light of different respective colors from source 10 reflected from control surface 9 and directing such light to a plurality of respective photosensors, such as phototransistors 18, 19 and 20.

The light source fiber optic 11 and the pick-up fiber optics 12, 13 and 14 are preferably disposed in an elongated generally cylindrical member 21 resembling a baton, or wand, with a tip having the output ends of fiber optic 11 and the filtered input ends of optics 12, 13 and 14 positioned as shown in FIG. 2 for reading the colored control surface as the tip is moved thereacross.

Referring back to FIG. 1, the photosensors produce respective electrical output signals indicative of the presence or absence of light of the different respective colors, i.e. if colored surface 9 reflects red light, phototransistor 18 gives an electrical output signal; if green light, phototransistor 19 produces an output signal; and if blue light, 20 produces an output. Spurious outputs from minimal intensities of light can be prevented by providing potentiometer sensitivity controls 22 or threshold devices to the photosensor outputs.

The outputs of the photosensors are applied to a multiple-frequency tone generator, generally denoted 23, for selectively generating one of a plurality of different frequency tones dependent upon the combination of different colors detected by the photosensors. In a preferred embodiment, the generator comprises a switching circuit 24, such as a binary coded decimal (BCD) to decimal convertor, a switchable multiple-frequency audio frequency oscillator 25, an amplifier 26 (if needed) and a loudspeaker 27. In response to the outputs from the photosensors, the switching circuit 24 selectively activates the switchable multiple-frequency oscillator to generate a particular frequency uniquely in accordance with the combination of output signals from the photosensors. The oscillator output signal is then amplified by amplifier 26 to produce a corresponding tone from loudspeaker 27.

In one embodiment, it is contemplated that the eight possible combinations of the colors red, green and blue (including the absence of any of them) on the control surface will be used to trigger tones corresponding in pitch to seven corresponding notes on a musical scale. An exemplary correlation between color combinations and tonal frequencies is set forth in Table 1 below, there R, B and G designate detectable colors of red, blue and green in the light reflected from control surface 9, and the corresponding frequencies are the ascending notes A (below middle C) through A, in the key of C major.

| Color Combination | Tonal Frequency (Hertz) |
| --- | --- |
| R | 440.00 |
| B | 493.88 |
| G | 523.25 |
| R + G | 587.33 |
| G + B | 659.26 |
| R + B | 698.46 |
| R + B + G | 783.99 |
| None of R, B and G | 880.00 |

By using additional primary colors, the number of different tones generated may be increased; for example a fourth primary color doubles the range of tones that may be generated to two octaves.

FIG. 3 shows the circuit diagram of one form of switchable, multiple-frequency audio oscillator for generating musical notes in accordance with the above tabulated color combinations. Since only seven outputs are available on the particular encoder shown, the 880 hertz tone is omitted. The individual circuit components are all standard items and may have the values of resistance and capacitance set forth in the drawing. The CD4051AE chip is a binary -to- decimal convertor that emits a particular output on one of the outputs numbered 1-7, corresponding to each combination of inputs A, B and C from phototransistors 18, 19 and 20. The resistance value thus inserted in series with terminal 6 of the 555 timer determines the frequency of the timer output signal, which drives speaker 27.

The particular components shown are available in highly miniaturized form, but any standard electronic components suitable for the particular application may be used.

In the preferred method of using the invention, it is contemplated that the user will be provided with a plurality of colored markers, such as crayons, for marking a sheet with a plurality of primary colors, such as red, green and blue, and additive color combinations thereof such as yellow, blue-green, violet, white (the sum of all three primaries) and black (the absence of all of the three primaries). The user will use these colored markers to compose a musical composition by marking strips of different colors and different lengths across a sheet of paper, thus creating a colored control surface. The color of each strip determines the pitch of the note and the length of the strip determines its duration.

The composition thus created is played by moving the light source and light-selective pick-up along the colored strips of the control surface, as by moving the tip of baton 21 over the strip. Depending upon the color of the control surface, one or more photosensors are activated, in turn activating the multiple-frequency tone generator to produce a musical tone coded in pitch to the color of the control surface. Tempo is controlled by the speed at which the pick-up is moved across the control surface.

The provision of additional manual switches connected to change the resistors $R_1$-$R_7$ shown in FIG. 3 may be used to convert from a major to a minor mode, or to modulate to a different key by changing the pitch of the output tones.

The control surface may be printed in half-tone with the primary colors printed separately to form the combined colors in accordance with conventional printing methods. Where crayons are employed, the combination colors are preferably formed of the two or more primary colors that make them up; e.g. a blue-green crayon would be formed of blue and green pigments. Preferably, for instructional purposes, the set of such crayons is ordered, and the resistors $R_1$-$R_7$ are correspondingly ordered, such that the darkest color crayon corresponds to the lowest frequency tone generated and successively lighter colors correspond to tones of successively higher pitch.

It will be readily appreciated that this device and method are particularly advantageous for teaching musical composition to children because pitch, duration and tempo are controlled by readily perceived variations in color, length and speed, respectively.

While the invention has been described in connection with only a small number of specific embodiments, it is to be understood that these are merely illustrative of many other specific embodiments which can also utilize the principles of the invention. Numerous and varied devices can be made by those skilled in the art without departing from the spirit and scope of the present invention, which is defined in accordance with the following claims.

I claim:

1. An optical generating device for use as a teaching or musical aid for generating a tone coded in pitch to the color of a colored control surface, comprising:
   a generally elongated member configured to be handheld at least at a first end portion as a baton or wand;
   a light source attached to said generally elongated member and adapted to direct light onto such colored control surface when said generally elongated member is guided thereover;
   a plurality of color-selective light pick-up and transmitting means attached to said generally elongated member, said light pick-up and transmitting means being responsive to light of different respective colors reflected from such colored control surface and adapted to direct said light onto a respective plurality of photosensors when said generally elongated member is guided thereover and light is directed thereon from said light source;

a plurality of light responsive photosensors positioned and adapted to receive light from said respective color-selective light pick-up and transmitting means and capable of producing respective electrical output signals indicative of the presence or absence of light of said respective colors;

multiple-frequency tone generation means positioned and adapted to receive the output signals of said photosensors for selectively generating one of a plurality of different frequency tones dependent upon the specific combination of photosensors activated by such control surface when said generally elongated member is manually directed over such colored control surface.

2. An optical tone generating device according to claim 1 wherein:

at least a major portion of said generally elongated member is generally cylindrical and said light source comprises an incandescent lamp and fiber optic means positioned within said generally cylindrical member for transmitting light from said lamp onto such colored control surface when said member is guided thereover.

3. An optical tone generating device according to claim 1 wherein said plurality of color-selective light pick-up means comprises a plurality of filtered fiber optics.

4. An optical tone generating device according to claim 1 wherein at least a major portion of said generally cylindrical member is in the form of an elongated, generally cylindrical tube and said plurality of color-selective light pick-up means comprises a plurality of filtered fiber optics disposed in said elongated, generally cylindrical tube.

5. An optical tone generating device according to claim 1 wherein:

said light source comprises an incandescent lamp and fiber optic means for transmitting light from said lamp onto such colored control surface;

said plurality of color-selective light pick-up means comprises a plurality of filtered fiber optics; and the light source fiber optics and the pick-up fiber optics are disposed in said elongated, generally cylindrical tube.

6. An optical tone generating device according to claim 1 wherein said plurality of color-selective light pick-up means comprises three such pick-up means responsive to red, green and blue light, respectively.

7. An optical tone generating device according to claim 1 wherein said plurality of photosensors comprises at least one phototransistor.

8. An optical tone generating device according to claim 1 wherein said multiple-frequency tone generating means comprises:

switching circuit means responsive to the outputs of said photosensors for activating a multiple-frequency audio frequency generator selectively in one of a plurality of frequencies in accordance with different combinations of output signals from said photosensors;

a switchable multiple-frequency audio frequency oscillator responsive to said switching circuit means for selectively generating one of a plurality of audio frequency electrical output signals;

amplifier means responsive to said oscillator for amplifying the oscillator output; and loudspeaker means responsive to the amplifier output for producing an output tone.

9. An optical tone generating device according to claim 8 wherein said switching circuit means is a binary coded decimal to decimal conversion means.

10. An optical tone generating device according to claim 1 wherein said multiple-frequency tone generation means comprises means for generating the notes of a musical scale.

* * * * *